United States Patent
Lee

(10) Patent No.: US 10,186,183 B2
(45) Date of Patent: Jan. 22, 2019

(54) DISPLAY DEVICE

(71) Applicant: SAMSUNG DISPLAY CO., LTD., Yongin, Gyeonggi-Do (KR)

(72) Inventor: Sang Wol Lee, Yongin-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 289 days.

(21) Appl. No.: 14/800,834

(22) Filed: Jul. 16, 2015

(65) Prior Publication Data

US 2016/0140888 A1 May 19, 2016

(30) Foreign Application Priority Data

Nov. 13, 2014 (KR) .......................... 10-2014-0158332

(51) Int. Cl.
*G09G 3/20* (2006.01)
*G06F 1/16* (2006.01)

(52) U.S. Cl.
CPC ............. *G09G 3/20* (2013.01); *G06F 1/1652* (2013.01); *G09G 2354/00* (2013.01); *G09G 2380/02* (2013.01)

(58) Field of Classification Search
CPC ...................... G06F 1/1652; G06F 2203/04102
See application file for complete search history.

(56) References Cited

U.S. PATENT DOCUMENTS

| | | | | |
|---|---|---|---|---|
| 9,836,148 | B2* | 12/2017 | Kim | G06F 3/041 |
| 2002/0057064 | A1* | 5/2002 | Onodera | G05G 9/047 |
| | | | | 318/2 |
| 2005/0040962 | A1* | 2/2005 | Funkhouser | G06F 1/1601 |
| | | | | 340/815.4 |
| 2010/0066716 | A1* | 3/2010 | Gerard-Goddet | G06F 3/038 |
| | | | | 345/211 |
| 2010/0164973 | A1* | 7/2010 | Huitema | G06F 1/1615 |
| | | | | 345/581 |
| 2014/0307396 | A1* | 10/2014 | Lee | H05K 1/028 |
| | | | | 361/749 |

FOREIGN PATENT DOCUMENTS

| | | |
|---|---|---|
| KR | 10-2007-0113625 A | 11/2007 |
| KR | 10-2011-0088872 A | 8/2011 |
| KR | 10-2014-0016073 A | 2/2014 |
| KR | 10-2014-0017391 A | 2/2014 |
| KR | 10-2014-0022180 A | 2/2014 |
| KR | 10-2014-0036499 A | 3/2014 |

\* cited by examiner

*Primary Examiner* — Amare Mengistu
*Assistant Examiner* — Shawna Stepp Jones
(74) *Attorney, Agent, or Firm* — Lee & Morse P.C.

(57) ABSTRACT

A display device, including a flexible display panel; and a first detector detecting deformation of the display panel, the display panel including a pixel portion including a plurality of pixels; and a driver including a circuit for writing data to the plurality of pixels, and the first detector being integrated into the driver.

18 Claims, 14 Drawing Sheets

DISPLAY DEVICE

CROSS-REFERENCE TO RELATED APPLICATION

Korean Patent Application No. 10-2014-0158332, filed on Nov. 13, 2014, in the Korean Intellectual Property Office, and entitled: "Display Device," is incorporated by reference herein in its entirety.

BACKGROUND

1. Field

Embodiments relate to a display device, for example, to a flexible display device.

2. Description of the Related Art

With the development of electronic technologies, various display devices such as, for example, televisions (TVs), notebook PCs, tablet PCs, and mobile phones, are in use.

SUMMARY

Embodiments may be realized by providing a display device, including a flexible display panel; and a first detector detecting deformation of the display panel, the display panel including a pixel portion including a plurality of pixels; and a driver including a circuit for writing data to the plurality of pixels, and the first detector being integrated into the driver.

The driver may be a flexible printed circuit board (FPCB).

The first detector may be integrated into the FPCB as a chip on flexible printed circuit (COF).

The first detector may be one or more of an acceleration sensor, a gyro sensor, or a geomagnetic sensor.

The first detector may detect the deformation of the display panel to output a sensing signal, and the display panel may select pixels among the plurality of pixels to which data signals are applied according to the sensing signal and may apply the data signals only to the selected pixels.

The display device may further include a main body accommodating the display panel. The main body may include a rotator rotating in response to drawn-out and drawn-in operations of the display panel.

The rotator may be a plate rotating on a rotation axis, and the display device may further include a printed circuit board (PCB) attached to one surface of the plate of the rotator and a second detector integrated into the PCB to detect rotation of the rotator.

The second detector may output a sensing signal corresponding to a rotating direction and an amount of rotation of the rotator, and the display panel may select pixels among the plurality of pixels to which data signals are applied according to the sensing signal and may apply the data signals to the selected pixels.

The main body may further include a support plate supporting the display panel while being disposed thereunder. The driver may be folded along a folding line to be attached under the support plate.

The main body may further include a grip portion attached to one edge of the display panel. The driver may be inside of the grip portion.

The rotator may have a substantially cylindrical shape and may include a rotating body rotating inside of the main body, and the display panel may be rolled around the rotating body.

The driver may be attached to one lateral side of the rotating body.

Embodiments may be realized by providing a display device including a display including a plurality of pixels and a plurality of scan and data lines connected thereto; a scan driver applying a scan signal to the plurality of scan lines; a data driver applying a data signal to the plurality of data lines; a signal controller receiving image signals and an input control signal and controlling operations of the scan driver and the data driver; and a detector integrated into a flexible printed circuit board (FPCB) including the scan driver, the data driver, and the signal controller, the detector detecting deformation of the display to output a sensing signal, and the signal controller controlling a display area where an image is displayed in the display according to the sensing signal.

The signal controller may select pixels among the plurality of pixels to which data signals are applied according to the sensing signal, and may apply the data signals only to the selected pixels.

The detector may be integrated into the FPCB as a flexible printed circuit (COF).

The detector may be one or more of an acceleration sensor, a gyro sensor, or a geomagnetic sensor.

Embodiments may be realized by providing a display device, including a flexible display panel; a rotator rotating in response to drawn-out and drawn-in operations of the display panel; a printed circuit board (PCB) attached to one surface of the rotator; and a detector integrated into the PCB to detect rotation of the rotator.

The detector may output a sensing signal corresponding to a rotating direction and an amount of rotation of the rotator, and the display panel may select pixels among a plurality of pixels included in the display panel to which data signals are applied according to the sensing signal and may apply the data signals only to the selected pixels.

The rotator may be a plate rotating based on a rotation axis, and the PCB may be attached to one surface of the plate of the rotator.

The rotator may have an approximately cylindrical shape and may include a rotating body rotating inside of a main body accommodating the display panel, and the display panel may be rolled around the rotating body.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
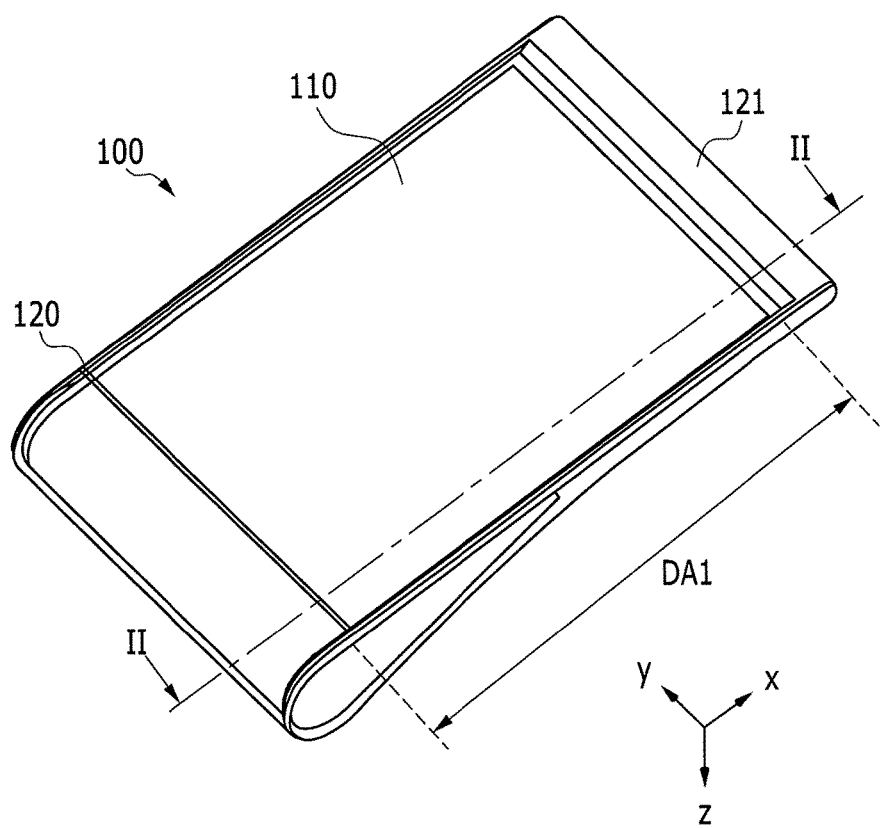
FIG. 1 illustrates a perspective view of a closed structure of a display device according to an exemplary embodiment.
Figure 2:
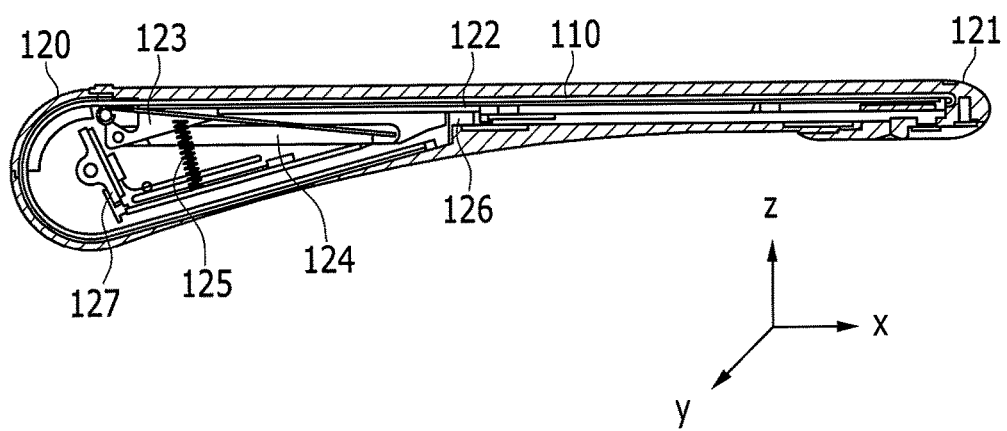
FIG. 2 illustrates a cross-sectional view of FIG. 1 taken along the line II-II.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Further, in exemplary embodiments, since like reference numerals designate like elements having the same configuration, a first exemplary embodiment is representatively described, and in other exemplary embodiments, only different configurations from the first exemplary embodiment will be described.

Parts that are irrelevant to the description will be omitted to clearly describe embodiments, and the same or similar constituent elements will be designated by the same reference numerals throughout the specification.

Throughout this specification and the claims that follow, when it is described that an element is "coupled" to another element, the element may be "directly coupled" to the other element or "electrically coupled" to the other element through a third element.

In addition, unless explicitly described to the contrary, the word "comprise" and variations such as "comprises" or "comprising" will be understood to imply the inclusion of stated elements but not the exclusion of any other elements.

In the drawings, the thickness of layers, films, panels, regions, etc., may be exaggerated for clarity.

It will be understood that when an element such as a layer, film, region, or substrate is referred to as being "on" another element, it can be directly on the other element or intervening elements may also be present.

In contrast, when an element is referred to as being "directly on" another element, there are no intervening elements present.

As a flexible display device that may be curved, bent, folded, or rolled like a piece of paper while maintaining characteristics of comparative flat panel displays, a display device according to embodiments may have a slidable structure or rollable structure.

First, a display device having a slidable structure will be described in detail with reference to FIGS. 1 to 8.

FIG. 1 illustrates a perspective view of a closed structure of a display device according to an exemplary embodiment.

Figure 3:
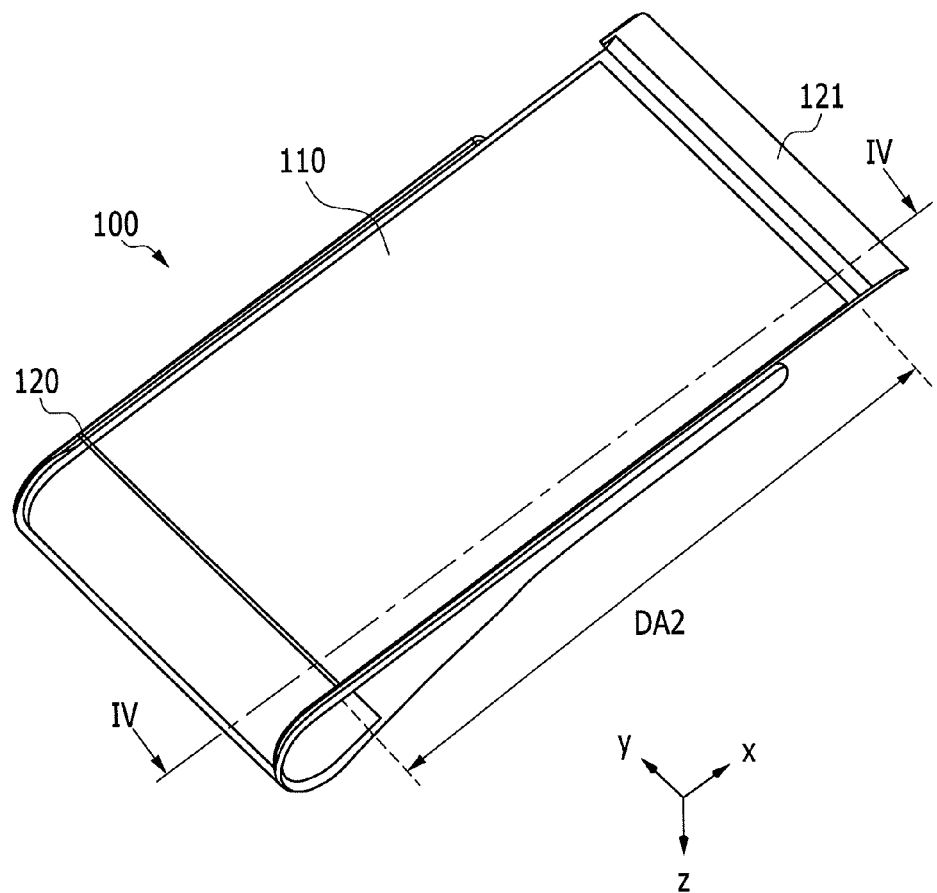
FIG. 3 illustrates a perspective view of an open structure of the display device according to an exemplary embodiment.
Figure 4:
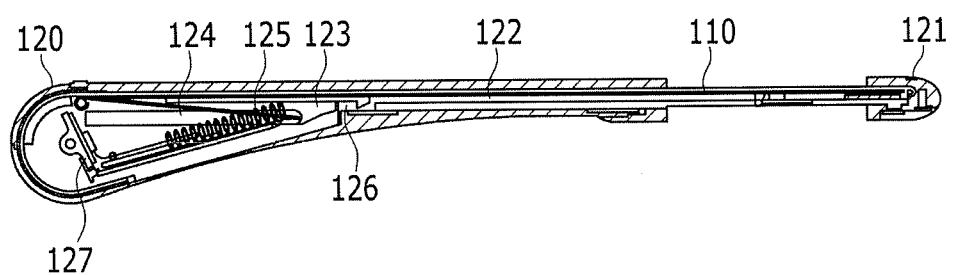
FIG. 4 illustrates a cross-sectional view of FIG. 3 taken along the line IV-IV.

FIG. illustrates is a cross-sectional view of FIG. 1 taken along the line II-II. FIG. 3 illustrates a perspective view of an open structure of the display device according to an exemplary embodiment. FIG. 4 illustrates a cross-sectional view of FIG. 3 taken along the line IV-IV. Referring to FIGS. 1 to 4, a display device 100 may include a display panel 110 and a main body 120.

The display panel 110 may display an image.

The display panel 110 may be produced from a flexible material that may be deformed by external pressure.

For example, the display panel 110 may be produced by forming a plurality of pixels on a flexible base substrate.

As the base substrate, a plastic substrate such as, for example, polyimide (PI), polycarbonate (PC), polyethylene terephthalate (PET), polyethersulfone (PES), polyethylene naphthalate (PEN), or fiber-reinforced plastic (FRP), may be used.

In an embodiment, as the base substrate, a flexible material such as, for example, thin glass or a metal foil, may be used.

As the display panel 110, an organic light emitting diode (OLED) display, an electroluminescent display (ELD), or a liquid crystal display (LCD), for example, may be employed.

The display panel 110 may be electronic paper (e-paper) for displaying an image using electrophoresis using a twist ball or a capsule.

The display panel 110 may employ various configurations and driving methods.

The display panel 110 may include, e.g., consist of, components that are formed of transparent materials.

For example, the display panel 110 may be formed of materials having a bendable and transparent property.

For example, the base substrate of the display panel 110 may be formed of a transparent polymer material such as plastic, and transistors constructing a plurality of pixels may be formed of a transparent material such as, for example, a zinc oxide or a titanium oxide.

Electrodes constructing the plurality of pixels may be formed of a transparent material such as indium tin oxide (ITO) or graphene.

The main body 120 may serve as a slide type of case for accommodating the display panel 110.

The main body 120 may include a grip portion 121, a support plate 122, a stopper 123, a stopper guide 124, an elastic member 125, a stopper holder 126, and a rotator 127.

The grip portion 121 may be attached to one edge of the display panel 110.

When a user grips and then pulls the grip portion 121, the display panel 110 accommodated in the main body 120 may be revealed outside, e.g., along an x-axis.

The support plate 122 may support the display panel 110 while being disposed thereunder, e.g., along a z-axis.

One edge of the support plate 122 may be attached to the grip portion 121 along with the display panel 110.

The support plate 122 may protect the display panel 110 from external impacts.

When the display panel 110 is formed of a transparent material, the support plate 122 may also be formed of a transparent material.

When the display panel 110 is drawn out further than a predetermined distance, the stopper 123 may fix the display panel 110, and the display panel 110 may not be drawn out further.

As shown in FIG. 1, when the display device 100 is in a closed state, a display area may have a width corresponding to DA1, e.g., along an x-axis.

When the user pulls the grip portion 12, e.g., along an x-axis, as shown in FIG. 3 and the display device 100 is in an open state, the display area may have a width corresponding to DA2 that is greater than DA1, and the display area may be expanded, e.g., along an x-axis.

When the display device 100 is in the open state, the display area may be fixed to the width of DA2 by the stopper 123.

The stopper 123 may be attached to the other edge of the support plate 122.

A closed state or closed structure of the display device 100 refers to a state in which the display panel 110 is placed in the main body 120, and the display panel 110 may not be viewed by a user or may only be partially viewed by the user.

An open state or open structure of the display device 100 refers to a state in which the display panel 110 is drawn out from the inside of the main body 120 to the outside, and an entire screen of the display panel 110 may be viewed by the user.

The stopper guide 124 may allow the stopper 123 to move in one direction, e.g., along an x-axis.

For example, the stopper guide 124 may guide the stopper 123 attached to the other edge of the display panel 110 to move in a direction toward which the display panel 110 moves.

When the display device 100 is in the open state, the elastic member 125 may provide restoring force, and the display panel 110 may be placed in the main body 120.

The elastic member 125 may be provided as, for example, a spring.

The elastic member 125 may be coupled to the stopper 123.

The stopper holder 126 may serve to hold the stopper 123, and the display device 100 may be fixed while being in the open state.

The stopper holder 126 may release the stopper 123 by a button provided in the main body 120 (not shown).

When the stopper 123 is released to be applied with the restoring force by the elastic member 125, the stopper 123 may be moved to its original position along the stopper guide 124, and the support plate 122 attached to the stopper 123 may also be moved to its original position.

As a result, the display panel 110 may be placed in the main body 120, and the display device 100 may be in the closed state.

The rotator 127 may rotate in response to drawn-out and drawn-in operations for allowing the display panel 110 to be drawn out from and in to the main body 120.

The rotator 127 may efficiently perform the drawn-out/in operation of the display panel 110 being drawn in and out of the main body 120 by allowing the display panel 110 to be rolled.

As described above, in the display device having the slidable structure 100, the display panel 110 may be deformed, and a width of the display area may be changed to DA1 and DA2.

A configuration and a method for detecting deformation of a display panel 110 will now be described with reference to FIGS. 5 and 6.

Figure 5:
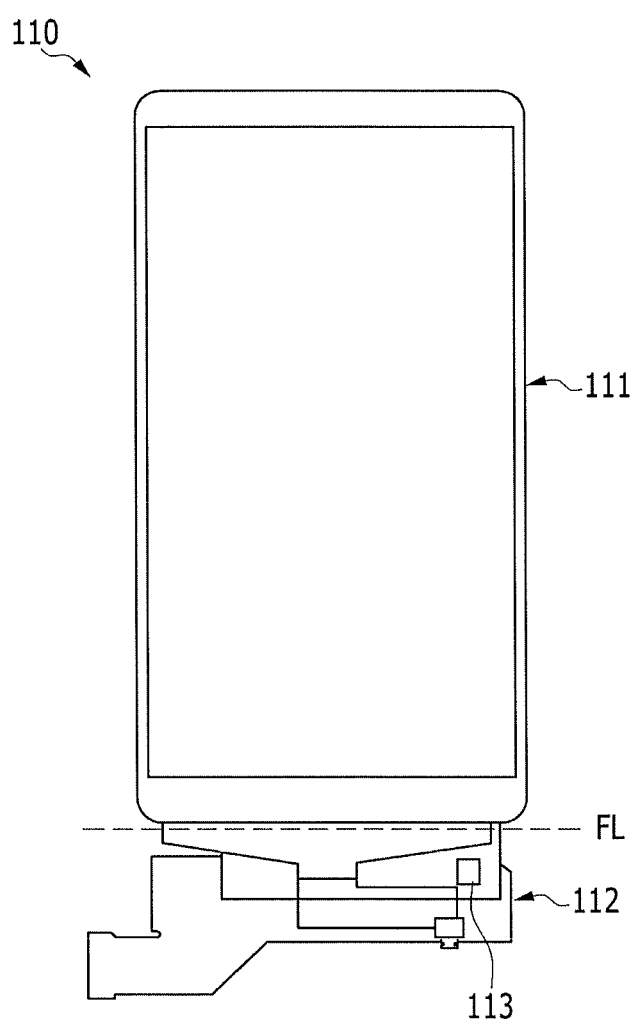
FIG. 5 illustrates a top plan view of a display panel of the display device according to an exemplary embodiment.

FIG. 5 illustrates a top plan view of the display panel of the display device according to an exemplary embodiment. Referring to FIG. 5, the display panel 110 may include a pixel portion 111 and a driving unit, e.g., driver, 112.

A plurality of pixels and a plurality of signal lines connected thereto may be disposed in the pixel portion 111.

The pixel portion 111 may correspond to a pixel area viewed by a user.

The entire pixel portion 111 may be viewed when the display device 100 is in an open state.

When the display device 100 is in a closed state, a part of the pixel portion 111 may not be viewed to a degree by which the display panel 110 is drawn in the main body 120.

The driving unit 112 may include a circuit for writing data to the plurality of pixels.

The driving unit 112 may be provided as a flexible printed circuit board (FPCB).

The driving unit 112 may be disposed inside of the grip portion 121, and the driving unit 112 may not be viewed by the user.

In an embodiment, the driving unit 112 may be folded along a folding line FL, e.g., between the pixel portion 111 and the driving unit 112, to be attached under the support plate 122.

A first detection unit, e.g., detector, 113 for detecting the deformation of the display panel 110 may be integrated into the driving unit 112.

The first detection unit 113 may be integrated into the FPCB as a chip on flexible printed circuit (COF).

The first detection unit 113 may be an acceleration sensor.

The acceleration sensor may be a sensor for measuring acceleration and a direction of the acceleration.

For example, the acceleration sensor may output a sensing signal corresponding to gravitational acceleration, which may vary according to slopes, e.g., orientation angles, of the device to which it is attached.

The driving unit 112 into which the first detection unit 113 is integrated may be disposed adjacent to the grip portion 121, and the sensing signal outputted from the first detection unit 113 may vary when the display panel 110 is moved in the closed or open state.

A pitch angle or a roll angle, for example, may be calculated by using the sensing signal of the first detection unit 113.

The deformation of the display panel 110 may be detected based on degrees of variations of the, for example, pitch angle or roll angle, that are calculated.

As the first detection unit 113, a gyro sensor or a geomagnetic sensor, for example, as well as the aforementioned acceleration sensor may be used.

The first detection unit 113 for generating the sensing signal may be integrated into the driving unit 112 of the display panel 110 that may be provided as the FPCB, and the configuration for detecting the deformation of the display device 100 may be realized with a minimum amount of space.

Figure 6:
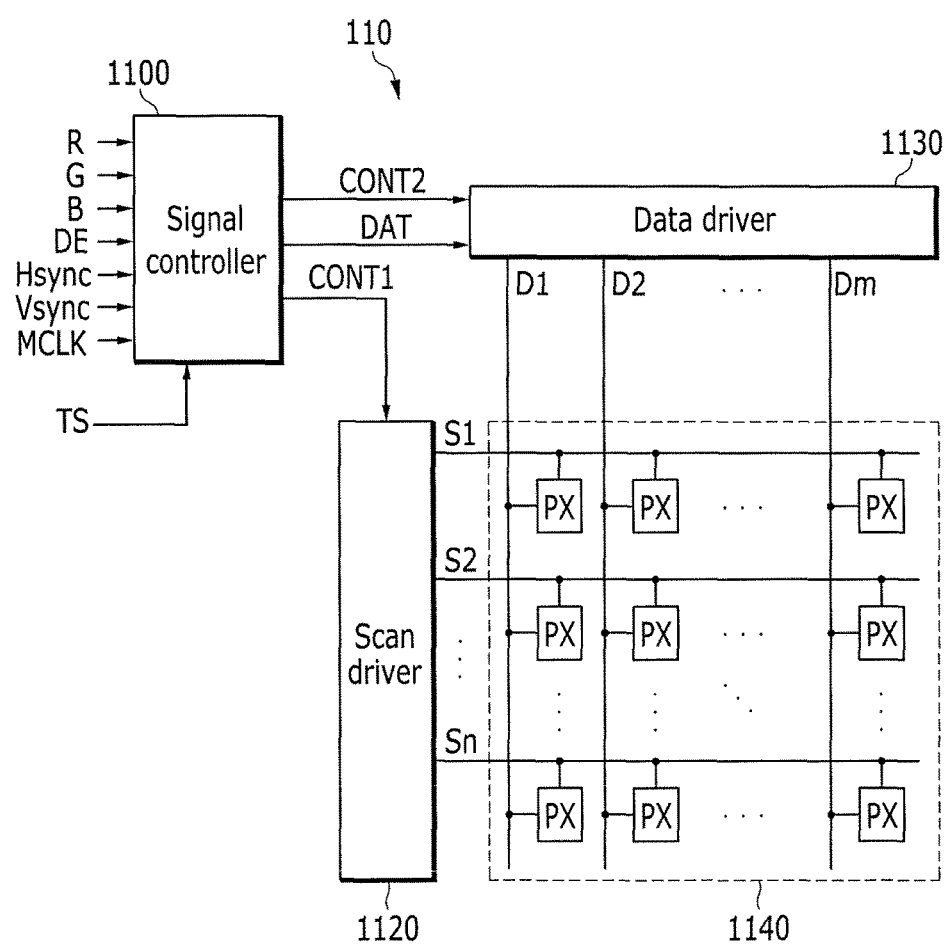
FIG. 6 illustrates a block diagram of the display panel of the display device according to an exemplary embodiment.

FIG. 6 illustrates a block diagram of the display panel of the display device according to an exemplary embodiment. Referring to FIG. 6, the display panel 110 may include a signal controller 1100, a scan driver 1120, a data driver 1130, and a display unit, e.g., display, 1140.

The display unit 1140 may correspond to the pixel portion 111 described above in FIG. 5.

The signal controller 1100, the scan driver 1120, and the data driver 1130 may correspond to the driving unit 112 described above in FIG. 5.

For example, the driving unit 112 may include the signal controller 1100, the scan driver 1120, and the data driver 1130.

The signal controller 1100 may receive input image signals R, G, and B and an input control signal that are inputted from an external device.

The image signals R, G, and B may contain luminance information of each pixel PX, and the luminance may have a predetermined number of gray levels, for example, 1024 (=$2^{10}$, 256 (=$2^8$) or 64 (=$2^6$) gray levels.

As the input control signal, there may be, for example, a vertical synchronization signal Vsync, a horizontal synchronization signal Hsync, a main clock signal MCLK, and a data enable signal DE.

The signal controller 1100 may generate a first driving control signal CONT1, a second driving control signal CONT2, and an image data signal DAT according to the image signals R, G, and B, the horizontal synchronization signal Hsync, the vertical synchronization signal Vsync, and the main clock signal MCLK.

The signal controller 1100 may control operations of the scan driver 1120 and the data driver 1130.

The signal controller 1100 may identify the image signals R, G, and B for each frame according to the vertical synchronization signal Vsync and for each scan line according to the horizontal synchronization signal Hsync, and the image data signal DAT may be generated.

The signal controller 1100 may transmit the image data signal DAT along with the second driving control signal CONT2 to the data driver 1130.

The display unit 1140 may include a plurality of pixels PX that are arranged in an approximate matrix form while being connected to a plurality of scan lines S1 to Sn, a plurality of data lines D1 to Dm, and a plurality of signal lines S1 to Sn and D1 to Dm.

The plurality of scan lines S1 to Sn substantially may extend in a row direction, and may be nearly parallel to each other.

The plurality of data lines D1 to Dm may substantially extend in a column direction, and may be nearly parallel to each other.

The scan driver 1120 may be connected to the plurality of scan lines S1 to Sn, and may generates the plurality of scan signals S[1] to S[n] according to the first driving control signal CONT1.

The scan driver 1120 may sequentially apply the scan signals S[1] to S[n] of a gate-on voltage to the plurality of scan lines S1 to Sn.

The data driver 1130 may be connected to the plurality of data lines D1 to Dm, may sample and hold the image data signal DAT according to the second driving control signal CONT2, and may apply a plurality of data signals to the plurality of data lines D1 to Dm, respectively.

The data driver 1130 may apply data signals having a predetermined voltage range to the plurality of data lines D1 to Dm in response to the scan signals S[1] to S[n] of the gate-on voltage, data, ay be written to the plurality of pixels PX.

The signal controller 1100 may receive a sensing signal TS that is outputted from the first detection unit 113 to detect deformation of the display unit 1140.

The signal controller 1100 may control a display area where an image is displayed according to the sensing signal TS.

In the display device having the slidable structure 100, the sensing signal TS may indicate a closed state or open state of the display device 100.

When the sensing signal TS indicates the open state of the display device 100, the signal controller 1100 may generate the image data signal DAT, and the image may be displayed on an entire region across the plurality of pixels PX (e.g., DA2 of FIG. 3).

The data driver 1130 may apply the data signals having the predetermined voltage range to the plurality of data lines D1 to Dm according to the image data signal DAT.

When the sensing signal TS indicates the closed state of the display device 100, the signal controller 1100 may generate the image data signal DAT, and the image may be displayed on the pixels PX among the plurality of pixels PX that correspond to the display area viewed by the user (e.g., DA1 of FIG. 1) in the closed state.

For example, the image data signal DAT may be generated, and the image may be displayed on some of the plurality of pixels PX.

The data driver 1130 may apply the data signals to the data lines D1 to Dk among the plurality of data lines D1 to Dj according to the image data signal DAT (1<j<m).

Except for the open and closed states of the display device 100, when the display panel 110 is in a state between the open state and the closed state, the sensing signal TS may indicate the display area viewed by the user (e.g., an area that is greater than DA1 of FIG. 1 and smaller than DA2 of FIG. 3).

The signal controller 1100 may generate the image data signal DAT, and the image may be displayed on the pixels PX corresponding to the display area viewed by the user.

The data driver 1130 may apply the data signals to the data lines D1 to Dk among the plurality of data lines D1 to Dm according to the image data signal DAT (j<k<m).

The pixels to which the data signals are applied may selected be from the plurality of pixels PX according to the sensing signal TS and the data signals may then be applied only to the selected pixels, and an image may be displayed only on the display area corresponding to the area viewed by the user.

For example, the appropriate image may be displayed on the display area corresponding to the area viewed by the user according to the deformation of the display unit 1140.

The signal controller 1100 may generate, after receiving the sensing signal TS, the image data signal DAT to display the image on the display area corresponding to the area viewed by the user.

The sensing signal TS outputted from the first detection unit 113 may be transmitted to an external controller (not shown) for generating the image signals R, G, and B and the input control signal, and the image signals R, G, and B and the input control signal may be generated in response to the display area indicated by the sensing signal TS.

In addition to the configuration in which the first detection unit 113 for detecting the deformation of the display unit 1140 is integrated into the FPCB of the display panel 110, the detection unit may be implemented on a printed circuit board (PCB).

This will be described with reference to FIGS. 7 and 8.

Figure 7:
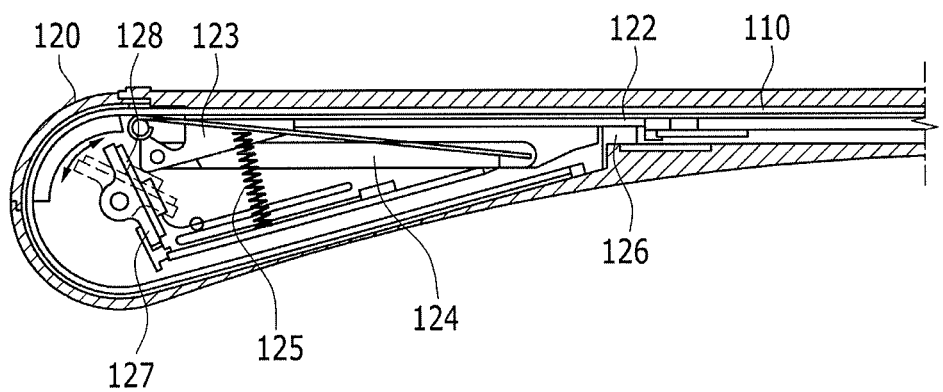
FIG. 7 illustrates a side cross-sectional view of a second detection unit implemented as a PCB in the display device according to an exemplary embodiment.

FIG. 7 illustrates a side cross-sectional view of a second detection unit implemented as a PCB in the display device according to an exemplary embodiment. FIG. 8 illustrates a perspective view of the second detection unit implemented as the PCB in the display device according to an exemplary embodiment. Referring to FIGS. 7 and 8, the rotator 127 may be provided as a plate that rotates based on a rotation axis, and a PCB 128 may be attached to one surface of the plate of the rotator 127.

A second detection unit, e.g., detector, 129 for detecting rotation of the rotator 127 may be integrated into the PCB 128.

The second detection unit 129 may be provided as, for example, an acceleration sensor, a geomagnetic sensor, or a gyro sensor.

The rotator 127 may rotate in a corresponding direction toward which the display panel 110 is operated to be drawn out of the main body 120 and in a corresponding direction toward which the display panel 110 is operated to be drawn into the main body 120.

The second detection unit 129 may output a sensing signal TS corresponding to a rotating direction and an amount of rotation of the rotator 127.

The deformation of the display panel 110 may be detected based on the sensing signal TS.

The sensing signal TS may indicate, for example, positions of the display panel 110 that indicate an open state, a closed state, and an intermediate state therebetween of the display device 100.

As described above in FIG. 6, the sensing signal TS may be transmitted to the signal controller 1100 of the display panel 110, and the appropriate image may be displayed on the display area corresponding to the area viewed by the user according to the deformation of the display device 100.

Either one of the first detection unit 113 and the second detection unit 129 that are described above may be provided in the display device 100, or both the first detection unit 113 and the second detection unit 129 may be provided in the display device 100.

Next, a display device having a rollable structure will be described in detail with reference to FIGS. 9 to 13.

The display device having the rollable structure may have a configuration of the main body 120 that is different from that of the display device having the slidable structure.

Configurations that are similar or identical to those of the display device having the aforementioned slidable structure will be briefly described.

Figure 9:
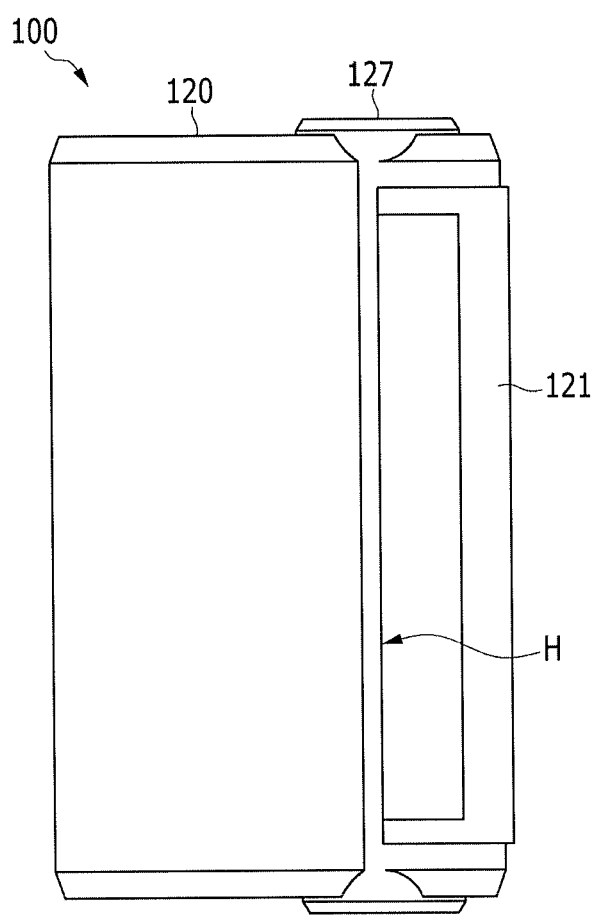
FIG. 9 illustrates a top plan view of a closed structure of a display device according to an exemplary embodiment.
Figure 10:
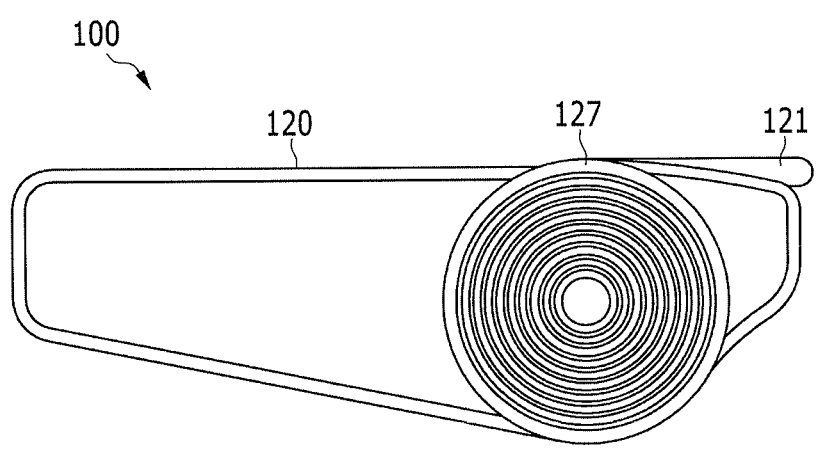
FIG. 10 illustrates a lateral side view of the closed structure of the display device according to an exemplary embodiment.
Figure 11:
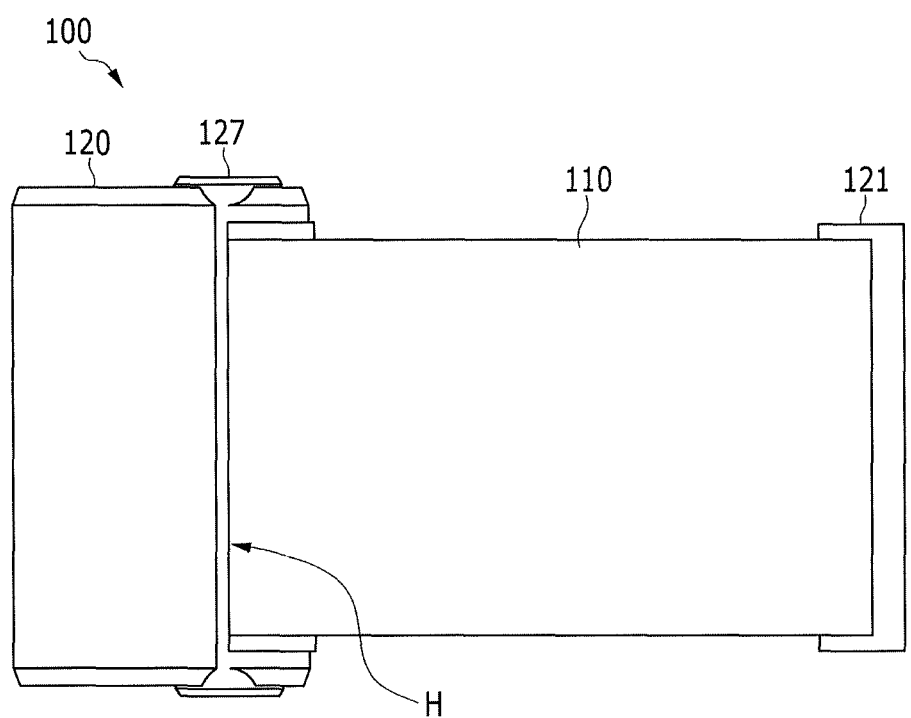
FIG. 11 illustrates a top plan view of an open structure of the display device according to an exemplary embodiment.
Figure 12:
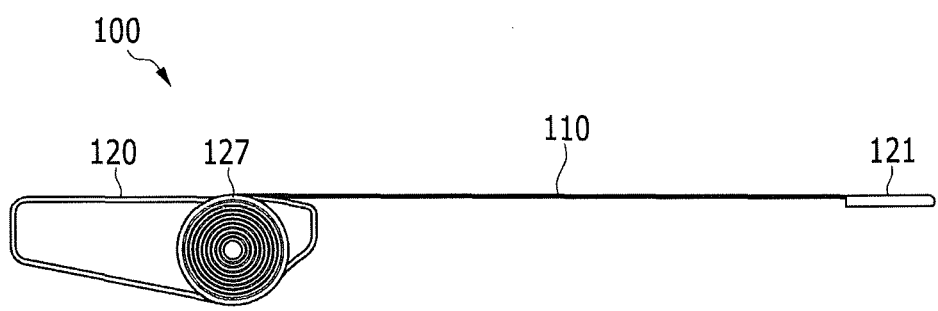
FIG. 12 illustrates a lateral side view of the open structure of the display device according to an exemplary embodiment.

FIG. 9 illustrates a top plan view of a closed structure of a display device according to an exemplary embodiment. FIG. 10 illustrates a lateral side view of the closed structure of the display device according to an exemplary embodiment. FIG. 11 illustrates a top plan view of an open structure of the display device according to an exemplary embodiment. FIG. 12 illustrates a lateral side view of the open structure of the display device according to an exemplary embodiment. Referring to FIGS. 9 to 12, the display device 100 may include a display panel 110 and a main body 120.

The main body 120 may serve as a roll type of case for accommodating the display panel 110.

The main body 120 may include a grip portion 121 and a rotator 127.

The display panel 110 may be produced from a material that may be deformed by external pressure, and may display an image.

As the display panel 110, an organic light emitting diode (OLED) display, an electro luminescent display (ELD), or a liquid crystal display (LCD), for example, may be employed.

The display panel 110 may be electronic paper (e-paper) for displaying an image using electrophoresis using a twist ball or a capsule.

The display panel 110 may be formed of a material having a bendable and transparent property.

The display panel 110 may be rolled around the rotator 127, and may be drawn in the main body 120 through an insertion gap H between the main body 120 and the rotator 127.

For example, in a closed state of the display device 100, the display panel 110 may be rolled around the rotator 127.

A grip portion 121 may be attached to one edge of the display panel 110.

When a user pulls the grip portion 121, the rotator 127 may be rotated to cause the rolled display panel 110 to be unrolled, and the display panel 110 may be drawn out of the main body 120.

A stopper (not shown) may be provided in the rotator 127.

When the display panel 110 is drawn out further than a predetermined distance, rotation of the rotator 127 may be halted by the stopper, and the display panel 110 may be fixed thereat.

Accordingly, the display device 100 may be in an open state, as shown in FIGS. 11 and 12.

A button for releasing the stopper (not shown) may be provided in the main body 120.

When a user presses the button, the stopper may be released and the rotator 127 may be rotated in a reverse direction, and the display panel 110 may be rolled back inside of the main body 120.

Accordingly, the display device 100 may be in the closed state, as shown in FIGS. 9 and 10.

The stopper may have a switch-like shape for halting an operation of a gear for rotating the rotator 127.

A configuration for detecting the deformation of the display panel 110 of the display device 100 having a rollable structure will now be described with reference to FIGS. 13 and 14.

Figure 13:
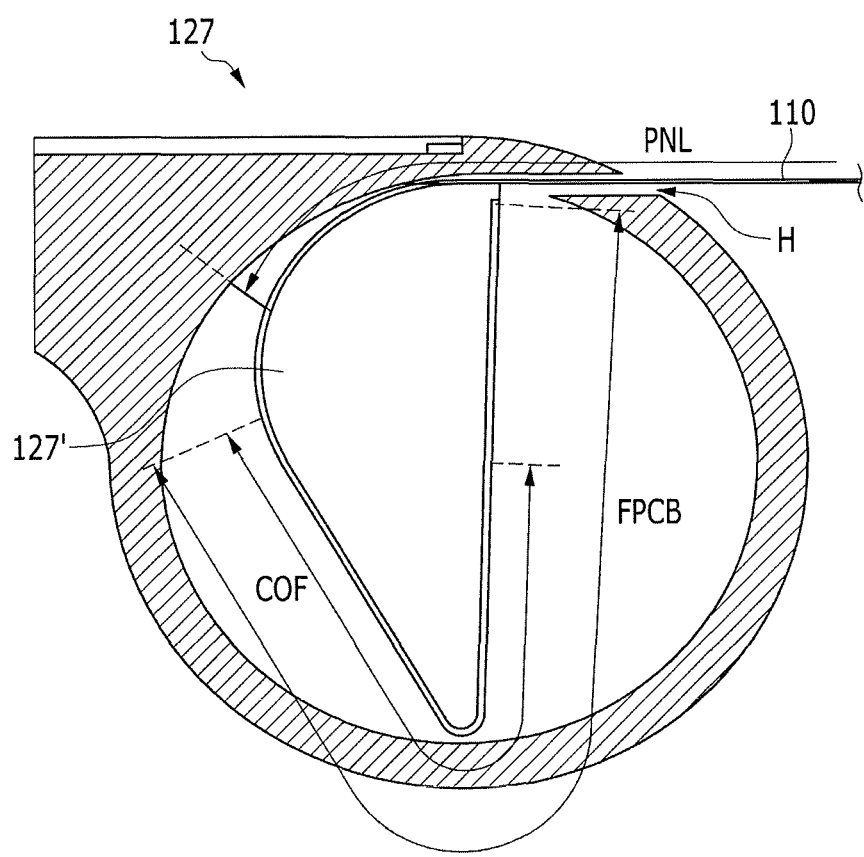
FIG. 13 illustrates a side cross-sectional view of a rotator of the display device according to an exemplary embodiment.

FIG. 13 illustrates a side cross-sectional view of a rotator of the display device according to an exemplary embodiment. Referring to FIG. 13, the rotator 127 may include a rotating body 127' that rotates inside of the main body 120.

The rotating body 127' may substantially have a cylindrical shape for forming a predetermined space with an interior of the main body 120.

For example, as illustrated, the rotating body 127' may have a cylindrical shape of which one lateral side is flatly cut.

The space formed by the rotating body 127' and the interior of the main body 120 may be an insertion gap H through which the display panel 110 may be drawn into the main body 120 and a space in which the display panel 110 drawn into the main body 120 may be accommodated.

The display panel 110 may be provided as illustrated in FIG. 5.

The driving unit 112 of the display panel 110 may be provided as a FPCB, and the driving unit 112 provided as the FPCB may be attached to one lateral side of the rotating body 127'.

A first detection unit 113 for detecting the deformation of the display panel 110 may be integrated into the FPCB.

The first detection unit 113 may be integrated into the FPCB as a chip on flexible printed circuit (COF).

An acceleration sensor, a gyro sensor, or a geomagnetic sensor, for example, may be used as the first detection unit 113.

The display panel 110 may be rolled or unrolled around the rotating body 127' depending on a rotating direction of the rotating body 127'.

When the display panel 110 is rolled, a pixel area PNL of the display panel 110 may be drawn into the main body 120.

When the rolling of the display panel 110 is unrolled, the pixel area PNL may be drawn out of the main body 120.

The rotating body 127' may be stopped by the stopper, and the FPCB part may not be drawn out of the main body 120.

The first detection unit 113 may be integrated into the driving unit 112 of the display panel 110 provided as the FPCB, the driving unit 112 may be attached to the rotating body 127' that rotates inside of the main body 120, and the configuration for detecting the deformation of the display device 100 may be implemented with a minimum amount of space.

Figure 14:
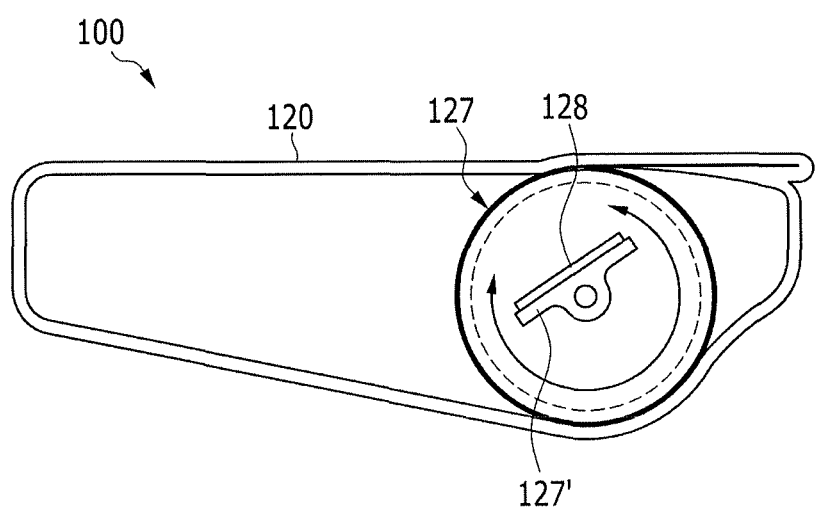
FIG. 14 illustrates a lateral side view of a second detection unit implemented as a PCB in the display device according to an exemplary embodiment.

Since a method for detecting the area viewed by the user using the sensing signal TS outputted by the first detection unit 113 and then displaying the appropriate image on the display area corresponding to the area viewed by the user is identical to that described in FIG. 6, a detailed description thereof will be omitted FIG. 14 illustrates a lateral side view of a detection unit implemented as a PCB in the display device according to an exemplary embodiment. Referring to FIG. 14, in a display device 100 having a rollable structure, a rotator 127 may be provided to have a cylindrical shape, and the display panel 110 may be rolled around the cylindrical rotator 127.

The rotator 127 may include a plate-shaped rotating body 127' that rotates inside of the rotator 127 based on a rotation axis.

A PCB 128 may be attached to one surface of the plate of the rotator 127.

A second detection unit 129 for detecting rotation of the rotator 127 may be integrated into the PCB 128.

Figure 8:
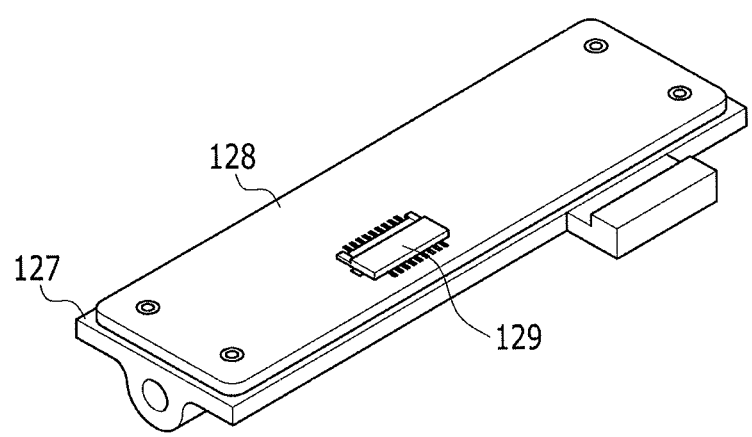
FIG. 8 illustrates a perspective view of the second detection unit implemented as the PCB in the display device according to an exemplary embodiment.

Since such a structure is the same as that described in FIG. 8, FIG. 8 may be referenced.

The second detection unit 129 may be provided as, for example, an acceleration sensor, a geomagnetic sensor, or a gyro sensor.

The rotating body 127' may rotate in a direction toward which the display panel 110 is operated to be unrolled out of the main body 120 and in a direction toward which the display panel 110 is operated to be rolled into the main body 120.

The second detection unit 129 may output a sensing signal TS corresponding to a rotating direction and an amount of rotation of the rotator 127.

The deformation of the display panel 110 may be detected based on the sensing signal TS.

In the display device 100 having the rollable structure, either one of the first detection unit 113 and the second detection unit 129 that are described above may be provided in the display device 100, or both the first detection unit 113 and the second detection unit 129 may be provided in the display device 100.

By way of summation and review, a next generation display device may be a flexible display device.

A flexible display device may refer to a display device having a characteristic like a piece of paper that may be easily deformed.

Since the flexible display device may be deformed to have various shapes, it may be used in various applications.

For example, the flexible display device may be implemented as wearable devices as well as mobile devices such as, for example, tablet PCs and mobile phones.

Unlike comparative display devices, such a flexible display device may be able to display an appropriate image on a deformed display area as its shape is deformed to have various shapes.

Embodiments provide a display device that may be capable of displaying an appropriate image on a deformed display area as well as detecting deformation of a flexible display device.

According to the deformation of the flexible display device, the appropriate image may be displayed on the display area corresponding to the area viewed by the user.

A configuration for detecting the deformation of the flexible display device may be realized with a structure requiring a minimum amount of space.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display device, comprising:
a flexible display including a plurality of pixels;
a flexible printed circuit board (FPCB) coupled to the flexible display;
a driving circuit writing data to the plurality of pixels of the flexible display; and
a first detector detecting deformation of the flexible display, wherein
the driving circuit and the first detector are integrated on the FPCB, wherein
the first detector is integrated on the FPCB as a chip on flexible printed circuit (COF), the first detector being folded away from the plurality of pixels of the flexible display.

2. The display device as claimed in claim 1, further comprising a grip portion at an edge of the flexible display to move the flexible display.

3. The display device as claimed in claim 1, wherein the first detector is one or more of an acceleration sensor, a gyro sensor, or a geomagnetic sensor.

4. The display device as claimed in claim 1, wherein:
the first detector detects the deformation of the flexible display to output a sensing signal,
pixels among the plurality of pixels to which data signals are applied according to the sensing signal are selected, and
the data signals are applied only to the selected pixels.

5. The display device as claimed in claim 1, further including a main body accommodating the flexible display, the main body including a rotator inside the main body to rotate in response to drawn-out and drawn-in operations of the flexible display.

6. The display device as claimed in claim 5, wherein:
the rotator is a plate rotating on a rotation axis, and
the display device further includes a printed circuit board (PCB) attached to one surface of the plate of the rotator and a second detector integrated into the PCB to detect rotation of the rotator.

7. The display device as claimed in claim 5, wherein:
the main body further includes a grip portion attached to one edge of the flexible display.

8. The display device as claimed in claim 7, wherein the grip portion of the main body is attached to one lateral side of the rotator.

9. The display device as claimed in claim 5, wherein:
the rotator has a substantially cylindrical shape and includes a rotating body rotating inside of the main body, and
the flexible display is rolled around the rotating body.

10. A display device, comprising:
a flexible display including a plurality of pixels;

a flexible printed circuit board (FPCB) coupled to the flexible display;

a driving circuit writing data to the plurality of pixels of the flexible display;

a first detector detecting deformation of the flexible display; and a main body accommodating the flexible display, the main body including a rotator inside the main body to rotate in response to drawn-out and drawn-in operations of the flexible display, wherein:

the driving circuit and the first detector are integrated on the FPCB, the rotator is a plate rotating on a rotation axis, the display device further includes a printed circuit board (PCB) attached to one surface of the plate of the rotator and a second detector integrated into the PCB to detect rotation of the rotator, and the second detector outputs a sensing signal corresponding to a rotating direction and an amount of rotation of the rotator, and pixels among the plurality of pixels to which data signals are applied according to the sensing signal are selected and the data signals are applied to the selected pixels.

11. A display device, comprising:

a flexible display including a plurality of pixels;

a flexible printed circuit board (FPCB) coupled to the flexible display;

a driving circuit writing data to the plurality of pixels of the flexible display;

a first detector detecting deformation of the flexible display; and a main body accommodating the flexible display, the main body including a rotator inside the main body to rotate in response to drawn-out and drawn-in operations of the flexible display, wherein:

the driving circuit and the first detector are integrated on the FPCB, the main body further includes a support plate supporting the flexible display while being disposed thereunder, and the FPCB is folded along a folding line to be attached under the support plate such that the driving circuit on the FPCB is under the support plate.

12. A display device comprising:

a display including a plurality of pixels and a plurality of scan and data lines connected thereto;

a scan driver applying a scan signal to the plurality of scan lines;

a data driver applying a data signal to the plurality of data lines;

a signal controller receiving image signals and an input control signal and controlling operations of the scan driver and the data driver; and a detector detecting deformation of the display to output a sensing signal, and the signal controller controlling a display area where an image is displayed in the display according to the sensing signal, wherein the detector, the scan driver, the data driver, and the signal controller are integrated on a flexible printed circuit board (FPCB), wherein the detector is integrated on the FPCB as a chip on flexible printed circuit (COF), the detector being folded away from the plurality of pixels of the display.

13. The display device as claimed in claim 12, wherein the signal controller selects pixels among the plurality of pixels to which data signals are applied according to the sensing signal, and applies the data signals only to the selected pixels.

14. The display device as claimed in claim 12, wherein the detector is one or more of an acceleration sensor, a gyro sensor, or a geomagnetic sensor.

15. A display device, comprising:

a flexible display;

a rotator rotating in response to drawn-out and drawn-in operations of the flexible display;

a printed circuit board (PCB) attached to one surface of the rotator; and a detector integrated on the PCB to detect deformation of the flexible display by detecting rotation of the rotator.

16. The display device as claimed in claim 15, wherein the detector outputs a sensing signal corresponding to a rotating direction and an amount of rotation of the rotator, and pixels among a plurality of pixels included in the flexible display to which data signals are applied according to the sensing signal are selected and the data signals are applied only to the selected pixels.

17. The display device as claimed in claim 16, wherein:

the rotator is a plate rotating based on a rotation axis, and the PCB is attached to one surface of the plate of the rotator.

18. The display device as claimed in claim 16, wherein:

the rotator has an approximately cylindrical shape and includes a rotating body rotating inside of a main body accommodating the flexible display, and the flexible display is rolled around the rotating body.

* * * * *